US010956076B2

(12) United States Patent
Mandela

(10) Patent No.: US 10,956,076 B2
(45) Date of Patent: Mar. 23, 2021

(54) INTEGRATED CIRCUIT CAPABLE OF SWITCHING BETWEEN NON-VOLATILE MEMORY-BASED AND VOLATILE MEMORY-BASED PROCESSOR EXECUTION

(71) Applicant: Texas Instruments Incorporated, Dallas, TX (US)

(72) Inventor: Venkateswara Rao Mandela, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/985,859

(22) Filed: May 22, 2018

(65) Prior Publication Data
US 2018/0341424 A1   Nov. 29, 2018

Related U.S. Application Data

(60) Provisional application No. 62/612,382, filed on Dec. 30, 2017.

(30) Foreign Application Priority Data

May 23, 2017   (IN) .............................. 201741018056

(51) Int. Cl.
  *G06F 9/445*   (2018.01)
  *G06F 9/4401*   (2018.01)
  (Continued)

(52) U.S. Cl.
  CPC .......... *G06F 3/0647* (2013.01); *G06F 3/0604* (2013.01); *G06F 3/065* (2013.01);
  (Continued)

(58) Field of Classification Search
  CPC ...... G06F 3/0647; G06F 3/0604; G06F 3/065; G06F 3/0685; G06F 9/44573; G06F 9/4403; G06F 9/445; G06F 12/0638; G06F 13/28
  See application file for complete search history.

(56) References Cited

U.S. PATENT DOCUMENTS 5,822,784 A * 10/1998 Garney ............... G06F 9/44573
                                                   711/208
6,282,624 B1   8/2001 Kimura
(Continued)

OTHER PUBLICATIONS

International Search Report dated Oct. 18, 2018.

*Primary Examiner* — Kalpit Parikh
(74) *Attorney, Agent, or Firm* — Brian D. Graham; Charles A. Brill; Frank D. Cimino

(57) ABSTRACT

Described examples include a system having a non-volatile memory including a binary section, a first page table and a second page table. The system also has a volatile memory and a processor coupled to the non-volatile memory and the volatile memory, the processor operable to use the first page table when the processor is initialized, the first page table including a first pointer to the binary section, the processor operable to cause copying of the binary section of the non-volatile memory to the volatile memory to create a copied binary section in the volatile memory, and the processor operable to use the second page table when the copying is complete, the second page table including a second pointer to the copied binary section.

20 Claims, 7 Drawing Sheets

(51) Int. Cl.
*G06F 3/06* (2006.01)
*G06F 12/06* (2006.01)
*G06F 13/28* (2006.01)

(52) U.S. Cl.
CPC .......... *G06F 3/0685* (2013.01); *G06F 9/4403* (2013.01); *G06F 9/445* (2013.01); *G06F 9/44573* (2013.01); *G06F 12/0638* (2013.01); *G06F 13/28* (2013.01)

(56) References Cited

U.S. PATENT DOCUMENTS

| | | |
|---|---|---|
| 7,177,184 B2 | 2/2007 | Chen |
| 2004/0221130 A1* | 11/2004 | Lai ...................... G06F 12/0292 711/203 |
| 2007/0067603 A1* | 3/2007 | Yamamoto .......... G06F 12/0246 711/207 |
| 2010/0058087 A1* | 3/2010 | Borras .................. G06F 1/3203 713/322 |
| 2011/0022819 A1 | 1/2011 | Post |
| 2011/0153912 A1 | 6/2011 | Gorobets |
| 2018/0039580 A1* | 2/2018 | Schneider ............. G06F 9/4403 |

* cited by examiner

INTEGRATED CIRCUIT CAPABLE OF SWITCHING BETWEEN NON-VOLATILE MEMORY-BASED AND VOLATILE MEMORY-BASED PROCESSOR EXECUTION

CROSS-REFERENCE TO RELATED APPLICATIONS

This application claims the benefit under 35 U.S.C. § 119(a) to co-owned Indian Provisional Patent Application No. 201741018056, filed May 23, 2017, and claims benefit under 35 U.S.C. § 119(e) to co-owned to U.S. Provisional Patent Application No. 62/612,382, filed Dec. 30, 2017, which applications are hereby fully incorporated herein by reference.

TECHNICAL FIELD

This application relates to executing code in computing systems, and more particularly, to execute-in-place (XIP) execution in a computing system.

BACKGROUND

In certain networks, devices connected to the network need a certain amount of time to go from a powered-off state to a communicative state. For example, vehicles often employ controller area networks (CANs). When the vehicle is off, almost all devices connected to the CAN do not have power. When the vehicle starts, these devices receive power. Vehicle manufacturers often specify that devices connected to the CAN must be able to answer a message on the CAN within a specified start-up period, which creates challenges for device designers.

SUMMARY

In accordance with an example, a system includes a non-volatile memory including a binary section, a first page table and a second page table. The system also includes a volatile memory and a processor coupled to the non-volatile memory and the volatile memory, the processor operable to use the first page table when the processor is initialized, the first page table including a first pointer to the binary section, the processor operable to cause copying of the binary section of the non-volatile memory to the volatile memory to create a copied binary section in the volatile memory, and the processor operable to use the second page table when the copying is complete, the second page table including a second pointer to the copied binary section.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Compiled applications (binaries) for devices on controller area networks (CANs), as well as the boot ROM, may be stored in non-volatile memory, for example a read-only memory (ROM), such as an electrically erasable programmable read-only memory (EEPROM), because volatile memory loses its data when it loses power. Within a 50 ms start-up period, power up and read out from the ROM usually requires about 30 ms. This leaves 20 ms for the processor to begin executing to be ready to receive messages on the CAN. The processor can run the program in two ways: directly from the ROM (non-volatile memory) or from random access memory (RAM) (volatile memory) with the program read from the ROM to the RAM. Running the program directly from the ROM may be referred to herein as execute-in-place (XIP), which allows for quick start up. However, reading from the ROM is much slower than reading from RAM. Therefore, the operational speed of XIP is slow.

Operation from RAM is much faster than operating from ROM. However, operating from RAM requires copying the binary from ROM to RAM. The copying process may take much longer than the 20 ms available start up time. Therefore, this option may not feasible with tighter time constraints. One way to address this problem is to use a separate processor dedicated to communication with the CAN (e.g., a separate communication processor). However, using a separate processor dedicated to communication may not be cost effective in many situations.

Figure 1:
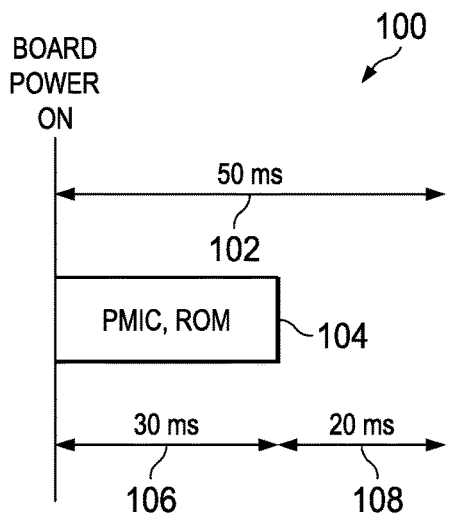
FIG. 1 is a timing diagram.

FIG. 1 is a timing diagram 100. Period 102 shows an example 50 ms requirement for response to messages from a CAN. Period 104 shows the time required for start of the power management integrated circuit (PMIC), execution of the boot ROM and the initial reading of the boot loader. In high noise environments, such as in vehicles, a separate PMIC isolates processing devices from noisy power sources. Therefore, processing cannot begin until 30 ms after power-up. For example, no processing occurs during period 106 and a device on the CAN must be ready to receive and respond to messages on the CAN at the end of period 108 or during the 20 ms after the end of period 106.

Figure 2:
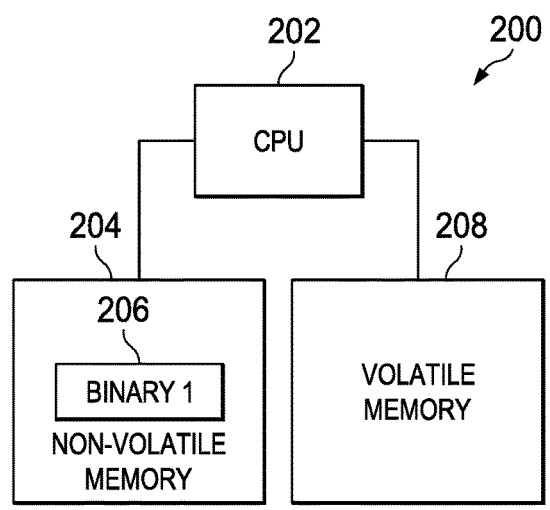
FIG. 2 is a block diagram of an example processing circuit.

FIG. 2 is a block diagram of an example processing circuit 200. Processor 202 is coupled to non-volatile memory 204 and volatile memory 208. Examples of non-volatile memory 204 are read-only memory (ROM), erasable programmable read-only memory (EPROM) and flash memory. Non-volatile memory 204 stores binary section 206. Binary section 206 includes instructions for the operation of processor 202. Because non-volatile memory 204 is non-volatile, non-volatile memory 204 maintains binary section 206 even when power is off. Volatile memory 208 loses data stored in volatile memory 208 when the power is off. In this example, volatile memory 208 is double data rate (DDR) random access memory (RAM), and thus processor 202 can read from and write to volatile memory 208 very quickly.

Figure 3:
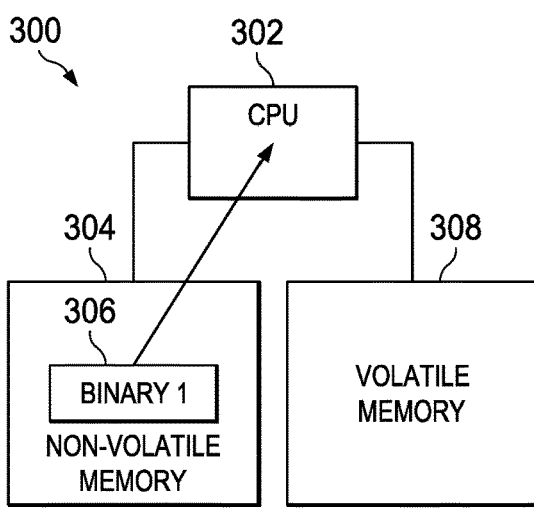
FIG. 3 is a block diagram illustrating an example processing circuit.

FIG. 3 is a block diagram illustrating an example processing circuit 300. Processor 302 is coupled to non-volatile memory 304 and volatile memory 308. Non-volatile memory 304 stores binary section 306. Binary section 306 includes instructions for the operation of processor 302. In this example, processor 302 reads the instructions directly from the binary section 306. This allows processor 302 to quickly begin operation and meet the timing requirements illustrated in FIG. 1. However, because the access time for non-volatile memory 304 is slow, the ongoing operation of processor 302 has low performance.

Figure 4:
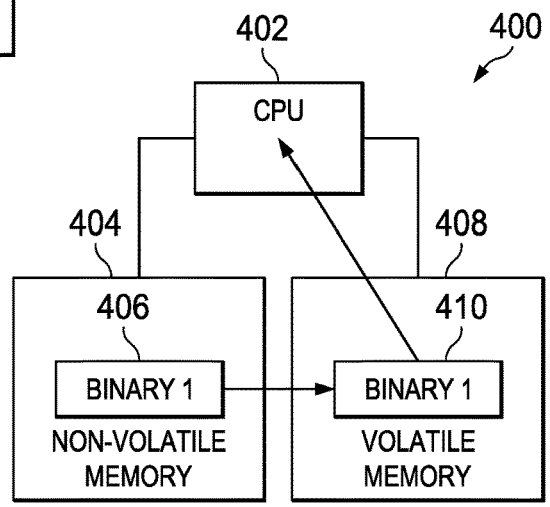
FIG. 4 is a block diagram illustrating an example processing circuit.

FIG. 4 is a block diagram illustrating an example processing circuit 400. Processor 402 is coupled to non-volatile memory 404 and volatile memory 408. Non-volatile memory 404 stores binary section 406. Binary section 406 includes instructions for the operation of processor 402. In this example, rather than reading binary section 406 directly from non-volatile memory 404, processor 402 first makes a copy of binary section 406 in volatile memory 408. FIG. 4 shows this as copied binary section 410. Processor 402 then reads the instructions from the copied binary section 410 after the copy is complete. However, the time necessary to copy binary section 406 to volatile memory 408 is too long to enable processor 402 to meet the timing requirements of FIG. 1.

Figure 5A:
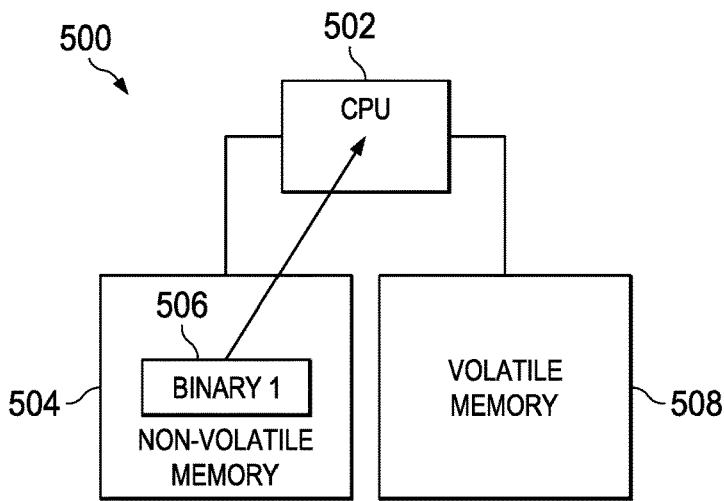
FIGS. 5A, 5B and 5C (collectively "FIG. 5") are block diagrams illustrating an example operation of an example processor circuit.
Figure 5B:
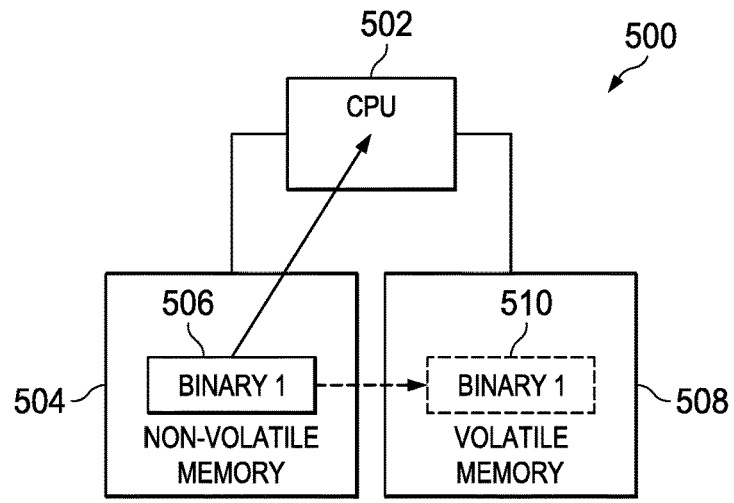
Figure 5C:
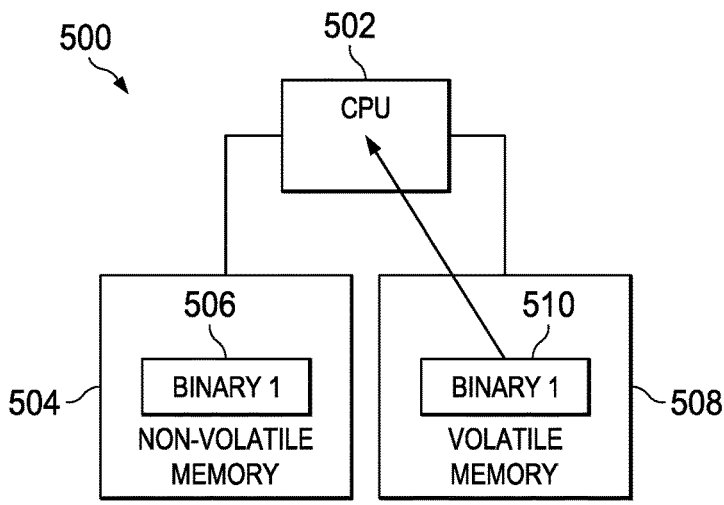

FIGS. 5A, 5B and 5C (collectively "FIG. 5") are block diagrams illustrating an example operation of processor circuit 500. In FIG. 5A, processor 502 is coupled to non-volatile memory 504 and volatile memory 508. Non-volatile memory 504 stores binary section 506. Binary section 506 includes instructions for the operation of processor 502. In this example, processor 502 reads the instructions from the binary section 506. This allows processor 502 to quickly begin operation and meet the timing requirements illustrated in FIG. 1. As illustrated in FIG. 5B, while processor 502 is executing using binary section 506, processor 502 makes a copy of binary section 506 in volatile memory 508. FIG. 5B shows this as copied binary section 510. FIG. 5C shows that, when copied binary section 510 is complete (e.g., when the copying is complete), processor 502 executes copied binary section 510 rather than binary section 506. Therefore, processor circuit 500 meets the timing constraints of FIG. 1 while providing the improved performance of executing copied binary section 510 from volatile memory 508. FIGS. 6A-6D hereinbelow show further details of the handover of execution from binary section 506 to copied binary section 510.

Figure 6A:
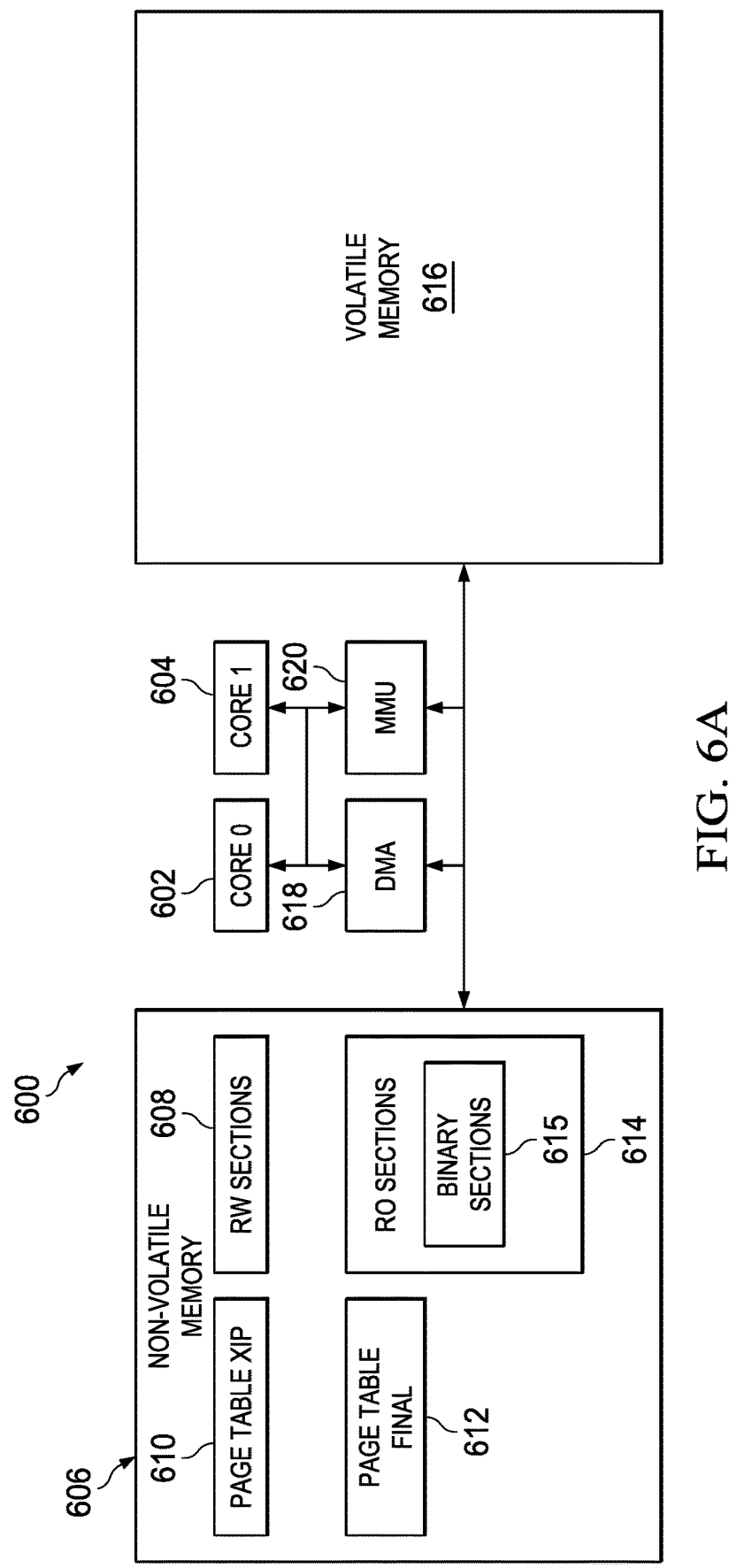
FIGS. 6A-6D (collectively "FIG. 6") are block diagrams illustrating an example processor circuit.
Figure 6B:
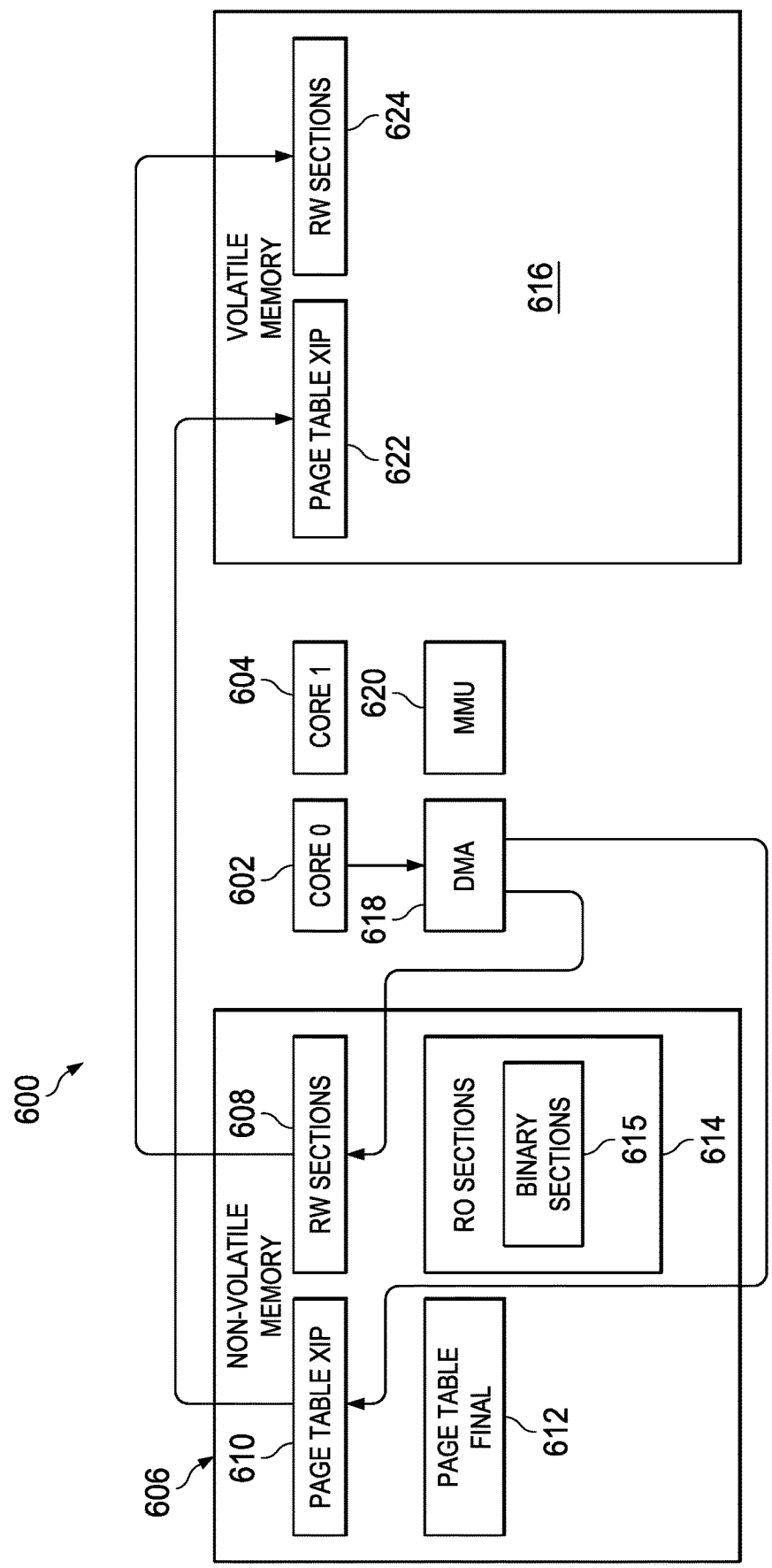
Figure 6C:
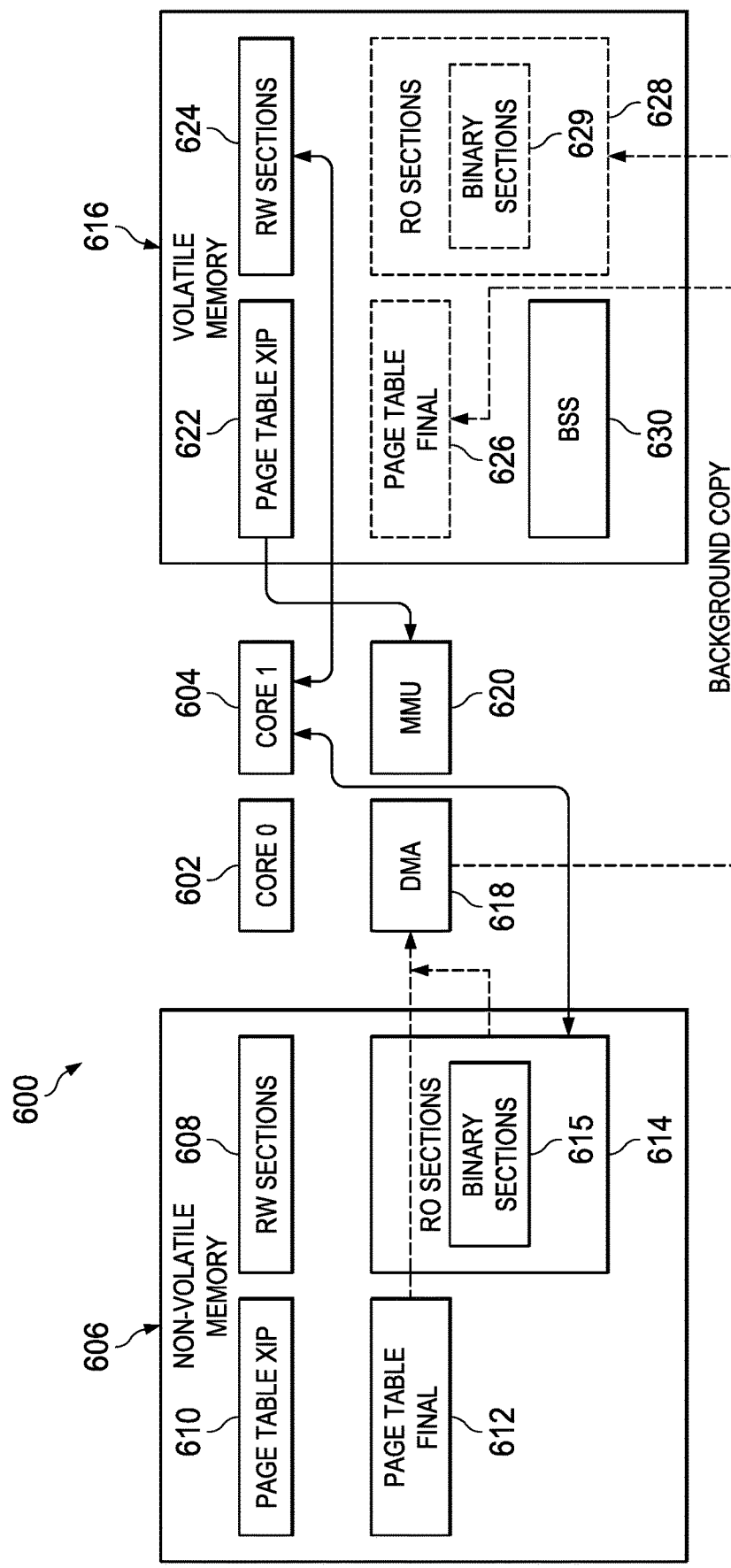
Figure 6D:
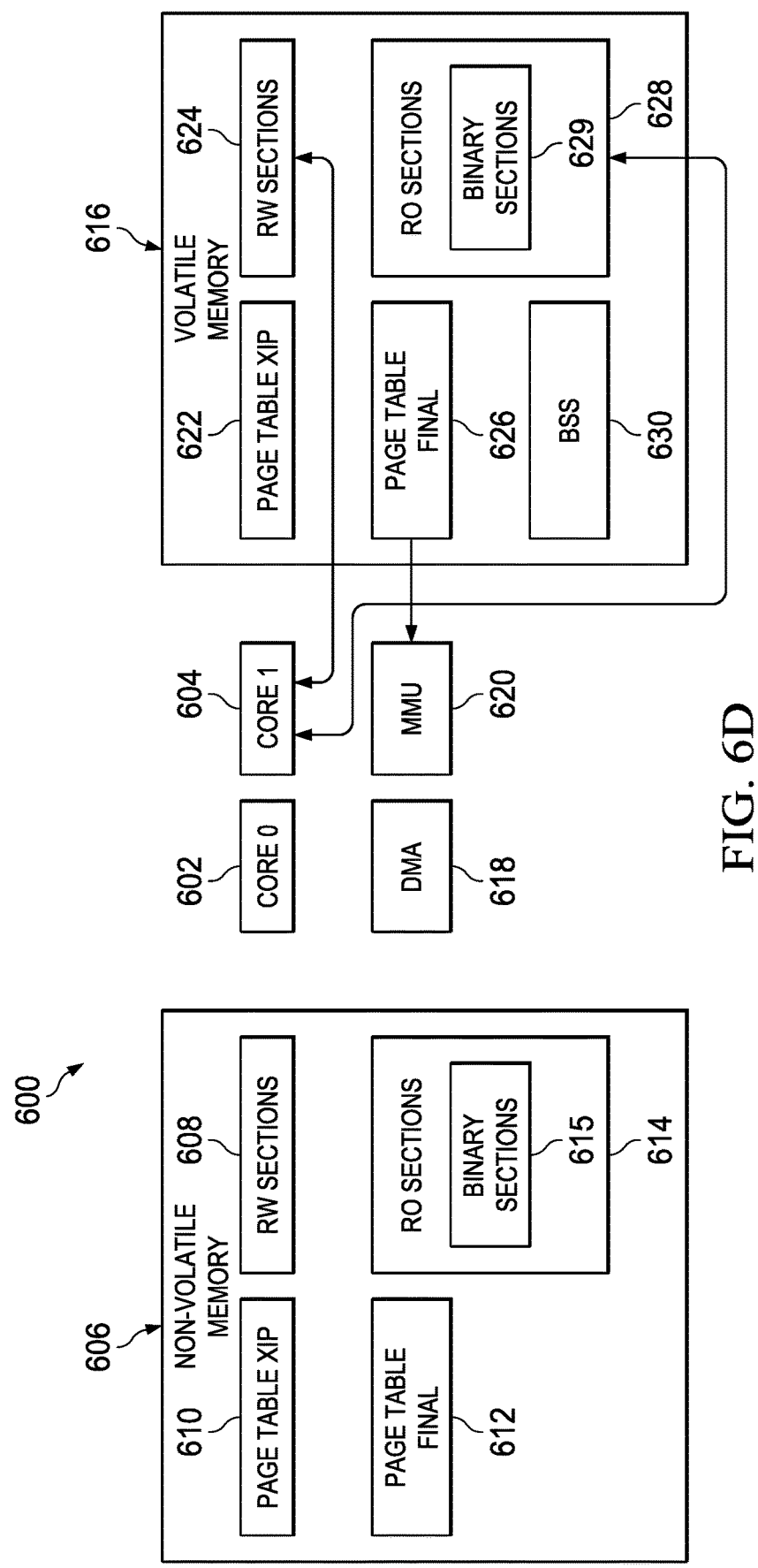

FIGS. 6A-6D (collectively "FIG. 6") are block diagrams illustrating an example processor circuit 600. Processor circuit 600 includes two processing cores 602 and 604 in this example. Core 602, in an example, is an A15 core according to a design by ARM, Ltd. Core 604, in an example, is an M4 core that is also according to a design by ARM, Ltd. In this example, core 602 is the more powerful A15 core for fast start-up, while the M4 is more cost, space and power efficient for normal operation. In other examples, processor circuit 600 includes additional processing cores. In this example, core 602 is a managing core that begins processing after a reset to processor circuit 600 due to power loss, application failure, etc. Core 604 handles communication, such as with a CAN, among other functions. Core 602 and core 604 couple to memory management unit (MMU) 620 and direct memory access controller (DMA) 618. MMU 620 manages access to all memory. DMA 618 handles memory transfers without processor or MMU control, other than instructions to initialize the transfer. DMA 618 and MMU 620 couple to non-volatile memory 606 and volatile memory 616. FIG. 6A includes lines showing the coupling between core 602, core 604, DMA 618, MMU 620, non-volatile memory 606 and volatile memory 616 by, in this example, a system of buses. FIGS. 6B-6D omit these coupling lines for clarity.

Examples of non-volatile memory 606 are electrically erasable programmable read-only memory (EEPROM), flash memory (e.g., non-volatile read/write memory) or other types of read-only memory. Non-volatile memory 606 includes read-only (RO) sections 614. RO sections 614 include, for example, a communications application in compiled, binary format in a binary section 615. RO sections 614 also include constants and other invariable information necessary to execute the program. Non-volatile memory 606 also includes read/write (RW) sections 608. RW sections 608 include formatting and other structural elements for (non-constant) variables of the application. Non-volatile memory 606 also includes page table XIP 610 and page table final 612 (also referred to as XIP page table and final page table, respectively). The page tables are tables of pointers used by MMU 620 to point to the appropriate memory element at the appropriate time, as further explained hereinbelow. Briefly, core 604 addresses the binaries stored in binary section 615 using virtual addresses. MMU 620 uses page table XIP 610 to convert the virtual addresses to physical addresses in non-volatile memory 606. After RO sections 614 is copied to volatile memory 616, MMU switches to using page table final 612 (as copied to volatile memory 616, as further explained hereinbelow). Then MMU 620 uses page table final 612 to convert the virtual addresses to physical addresses in volatile memory 616.

FIG. 6B is a block diagram showing the initial steps of preparing the memory for execution of the binary stored in RO sections 614 by core 604. Core 602 begins initial execution on reset when processor circuit 600 initializes due to, for example, a loss of power. Core 602 causes DMA 618 to copy RW sections 608 and page table XIP 610 to volatile memory 616 as copied RW sections 624 and copied page table XIP 622, respectively. These memory elements may be small and copy quickly (for example, in microseconds). Core 602 then triggers core 604 to begin processing. These memory elements allow core 604 to begin executing the binary stored in RO sections 614. Specifically, MMU 620 uses copied page table XIP 622 to point to memory locations to allow core 604 to begin execution in execute-in-place (XIP) mode. For example, for read-only sections, page table XIP 622 points to RO sections 614 in non-volatile memory 606. For read/write sections, page table XIP 622 points to RW sections 624 in volatile memory 616. Core 604 will also cause MMU 620 to create basic support section (BSS) 630 (FIG. 6C). BSS 630 provides basic variables for operation of core 604 apart from the specifically defined variables in RW section 624.

FIG. 6C is a block diagram showing the initial execution of the binary stored in RO sections 614 by core 604. As shown in FIG. 6C, MMU 620 uses copied page table XIP 622 to point core 604 to RO sections 614 for read-only data and to RW sections 624 for read/write data. Also, core 602 instructs DMA 618 to initiate a copy of page table final 612 and RO sections 614 to volatile memory 616 as copied page table final 626 and copied RO sections 628 (including a copied binary section 629), respectively. In an alternate example, using instructions stored in core 604 or instructions read from RO section 614, core 604 instructs DMA 618 to initiate a copy of page table final 612 and RO sections 614 to volatile memory 616 as copied page table final 626 and copied RO sections 628 (including a copied binary section 629), respectively. DMA 618 creates these copies independently of core 604 and avoids using the resources of core 604 to make the copies. The compilation process for the compiled application stored in RO section 614 specifically defines the variables in RW sections 624. Copied page table final 626 and copied RO sections 628 have dashed outlines in FIG. 6C to indicate that copies of copied page table final 626 and copied RO sections 628 are not yet complete.

FIG. 6D is a block diagram showing that core 604 operates using volatile memory 616 after the copies of copied page table final 626 and copied RO sections 628 are complete. For example, when DMA 618 completes copying copied page table final 626 and copied RO sections 628, DMA 618 issues an interrupt to core 602. In this example, an interrupt is any indication from the DMA 618 that copying is complete without regard to any specific format. In response to the interrupt, core 602 instructs MMU 620 to use page table final 626. Copied page table final 626 points to copied RW sections 624 and copied RO sections 628 to allow execution of the binary by core 604. Because copied RO sections 628 are read-only, the transfer from RO sections 614 to copied RO sections 628 is seamless. After the transition to copied page table final 626, core 604 executes at a much faster rate made possible by using volatile memory 616, which is much faster than non-volatile memory 606. For example, flash memory (a type of non-volatile memory) has typical access times on the order of 1500 ns while synchronous double-data-rate (DDR) RAM (a type of volatile memory) has typical access times on the order of 75 ns.

In an example, processor circuit 600 is an integrated circuit as a system-on-chip (SoC). In other examples, some or all components of processor circuit may be separate components and, in some examples, are packages in hybrid modules with the other components of processor circuit 600, and in other examples, are in separate packages. In addition, although FIG. 6 shows two cores, in some examples, the processor circuit can include only one core or more than two cores. In addition, other types of processing modules may be used, such as microprocessors.

Figure 7:
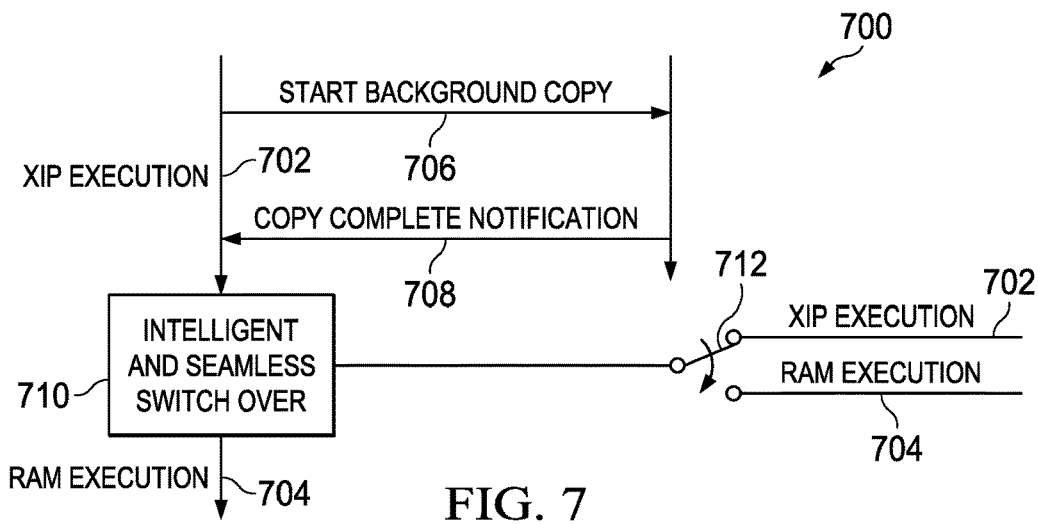
FIG. 7 is a graphical representation of the operation of the example of FIG. 6.

FIG. 7 is a graphical representation of the operation of the example of FIG. 6. The top portion of chart 700 represents XIP execution 702. When XIP execution 702 begins, start background copy 706 begins. When the background copy is complete, DMA 618 (FIG. 6) sends the copy complete notification 708. Then the intelligent and seamless switch over 710 changes switch 712 from XIP execution 702 to RAM execution 704. Switch 710 is a representation of the function where MMU 620 (FIG. 6) switches from using page table XIP 622 (FIG. 6) to final table final 626 (FIG. 6) in response copy completion notification from DMA 618 (FIG. 6) and thus core 604 operates using the RO sections 628 (FIG. 6).

Figure 8:
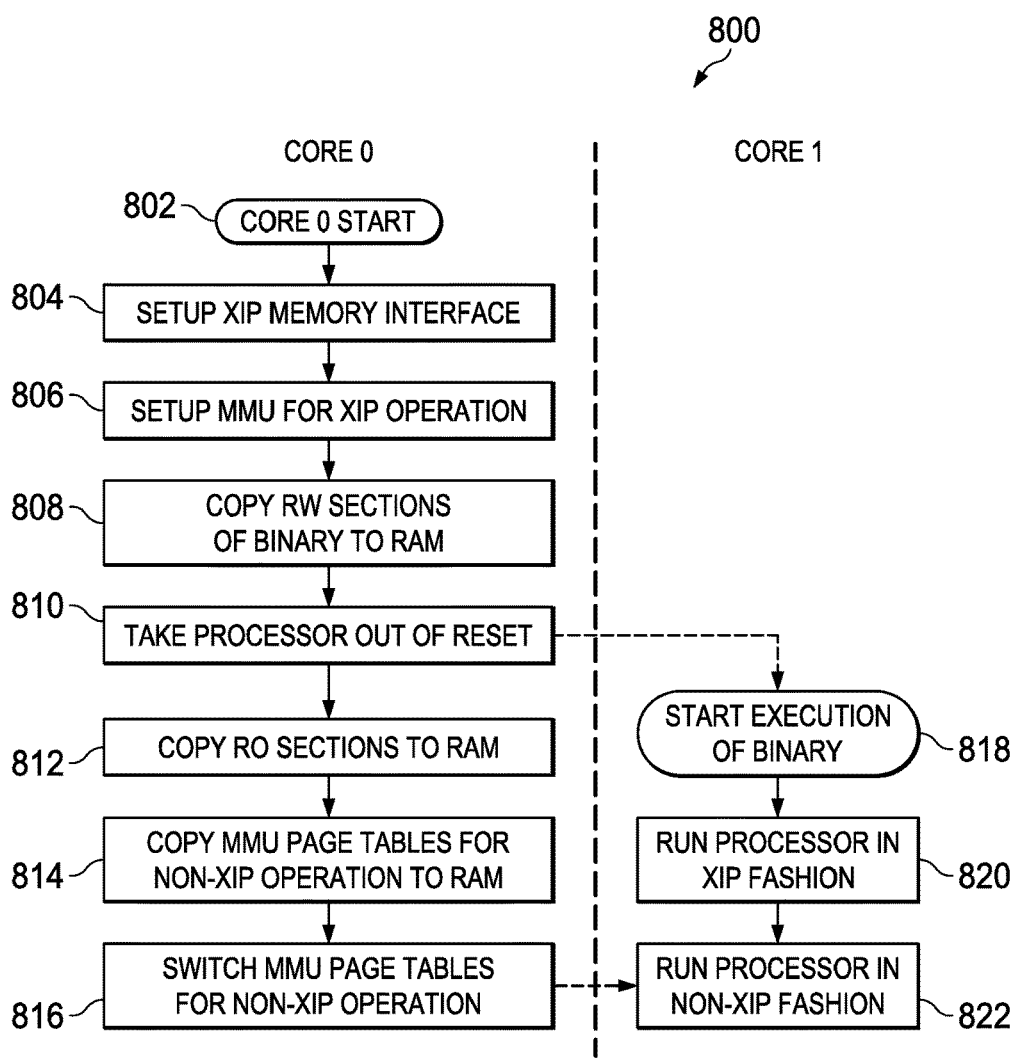
FIG. 8 is a flow diagram for an example method.

FIG. 8 is a flow diagram of an example method 800. Method 800 is an example method of operating the example of FIG. 6. In this example, core 0 602 (FIG. 6) performs steps on the left of the dashed line and core 1 604 (FIG. 6) performs steps on the right of the dashed line. Step 802 starts core 0 602 (FIG. 6). Step 804 sets up the XIP interface by copying the page table XIP 610 (FIG. 6) from non-volatile memory 606 to volatile memory 616 (FIG. 6). Step 806 sets up the MMU 620 (FIG. 6) to use copied page table XIP 622 (FIG. 6). Step 808 copies the RW sections 608 (FIG. 6) from non-volatile memory 606 to volatile memory 616 (FIG. 6). Step 810 takes core 1 604 (FIG. 6) out of reset mode. Step 812 copies the RO sections 614 (FIG. 6) in response to instructions from core 602 (FIG. 6) from non-volatile memory 606 (FIG. 6) to volatile memory 616 (FIG. 6). Step 814 copies the non-XIP page tables using DMA 618 (FIG. 6), for example page table final 612 from non-volatile memory 606 to volatile memory 616 (FIG. 6). Step 816 switches the page table used by MMU 620 (FIG. 6.) to begin using copied page table final 626 (FIG. 6). In parallel to steps 810, 812, 814, and 816, step 818 begins execution of the binary by core 1 604 (FIG. 6). Step 820 operates core 1 604 (FIG. 6) in XIP manner using copied page table XIP 622 (FIG. 6). Step 822 is in response to step 816 in that when MMU 620 switches from copied page table XIP 622 to copied page table final 626 (FIG. 6), core 1 604 will run in non-XIP manner.

Modifications are possible in the described examples, and other examples are possible, within the scope of the claims.

What is claimed is:

1. A system comprising:
a non-volatile memory comprising a binary section, a first page table, and a second page table;
a volatile memory; and
a processor coupled to the non-volatile memory and to the volatile memory, the processor configured to:
using the first page table, the first page table comprising a first pointer to the binary section in the non-volatile memory, read instructions from the binary section and execute the read instructions;
while the processor is using the first page table to read instructions from the binary section, copy the binary section of the non-volatile memory to the volatile memory to produce a copied binary section in the volatile memory; and
in response to the copying of the binary section being complete, and using the second page table, the second page table comprising a second pointer to the copied binary section in the volatile memory, read instructions from the copied binary section and execute the read instructions.

2. The system as in claim 1 wherein the binary section is in a read-only section.

3. The system as in claim 1 wherein the non-volatile memory is flash memory.

4. The system as in claim 1 wherein the processor has at least one core.

5. The system as in claim 1, wherein the processor is further configured to:
copy the first page table from the non-volatile memory into the volatile memory; and
copy the second page table from the non-volatile memory into the volatile memory;
wherein the first page table used by the processor to read instructions from the binary section for execution is the copy of the first page table in the volatile memory;
and wherein the second page table used by the processor to read instructions from the copied binary section is the copy of the second page table in the volatile memory.

6. The system as in claim 1 further including a direct memory access controller wherein the processor is operable to instruct the direct memory access controller to copy the binary section from the non-volatile memory to the volatile memory and provide an indication to the processor when copying of the binary section from the non-volatile memory to the volatile memory is complete.

7. The system of claim 1 wherein the binary section includes a communications application.

8. An integrated circuit comprising:
a memory management unit;
a direct memory access controller coupled to a volatile memory, to a non-volatile memory, and to the memory management unit, the non-volatile memory comprising a binary section, a first page table, and a second page table; and a processor coupled to the non-volatile memory, to the volatile memory, to the memory management unit, and to the direct memory access controller, the processor configured to:

cause the memory management unit to use the first page table to access the binary section in the non-volatile memory, the first page table comprising a first pointer to the binary section;

execute instructions from the binary section in the non-volatile memory;

while the memory management unit accesses the binary section in the non-volatile memory, cause the direct memory access controller to copy the binary section of the non-volatile memory to the volatile memory to produce a copied binary section in the volatile memory; and in response to the copying being complete, cause the memory management unit to access the copied binary section in the volatile memory using the second page table, the second page table comprising a second pointer to the copied binary section, and execute instructions from the copied binary section in the volatile memory.

9. The integrated circuit as in claim 8 wherein the binary section is in a read-only section.

10. The integrated circuit as in claim 8 wherein the processor has at least one core.

11. The integrated circuit as in claim 8, wherein the processor is further configured to:

copy the first page table from the non-volatile memory into the volatile memory; and copy the second page table from the non-volatile memory into the volatile memory;

wherein the first page table used by the processor to access the binary section in the non-volatile memory is the copy of the first page table in the volatile memory;

and wherein the second page table used by the processor to access the copied binary section in the volatile memory is the copy of the second page table in the volatile memory.

12. The integrated circuit of claim 8 wherein the binary section includes a communications application.

13. A method comprising:

copying a first page table from a non-volatile memory, to produce a copied first page table in a volatile memory;

using the copied first page table in the volatile memory, executing, with a processor, an application in a binary section of the non-volatile memory;

during the executing of the application in the binary section, copying the binary section and a second page table from the non-volatile memory to the volatile memory, to produce a copied binary section and a copied second page table in the volatile memory; and in response to the copying of the binary section and the second page table to the volatile memory being complete, continuing execution of the application by the processor using the copied second page table in volatile memory, the second page table comprising a second pointer to the copy of the binary section in the volatile memory.

14. The method of claim 13 in which the copying of the binary section and the second page table to the volatile memory is performed by a direct memory access controller.

15. The method of claim 13 in which the processor accesses the non-volatile memory and the volatile memory using a memory management unit and in which the memory management unit accesses the first page table and, after the copying of the binary section and the second page table to the volatile memory is complete, accesses the copy of the second page table in the volatile memory.

16. The method of claim 13 wherein the copying of the binary section and the second page table to the volatile memory is performed by a direct memory access controller.

17. The method of claim 13 wherein the non-volatile memory is a flash memory.

18. The method of claim 13 wherein the volatile memory is a RAM.

19. The method of claim 13 wherein the binary section is part of a read-only section.

20. The method of claim 13 wherein the application is a communications application.

* * * * *